Jan. 13, 1948.   A. H. DOWNS   2,434,312
MECHANICAL AGITATOR
Filed Dec. 20, 1945
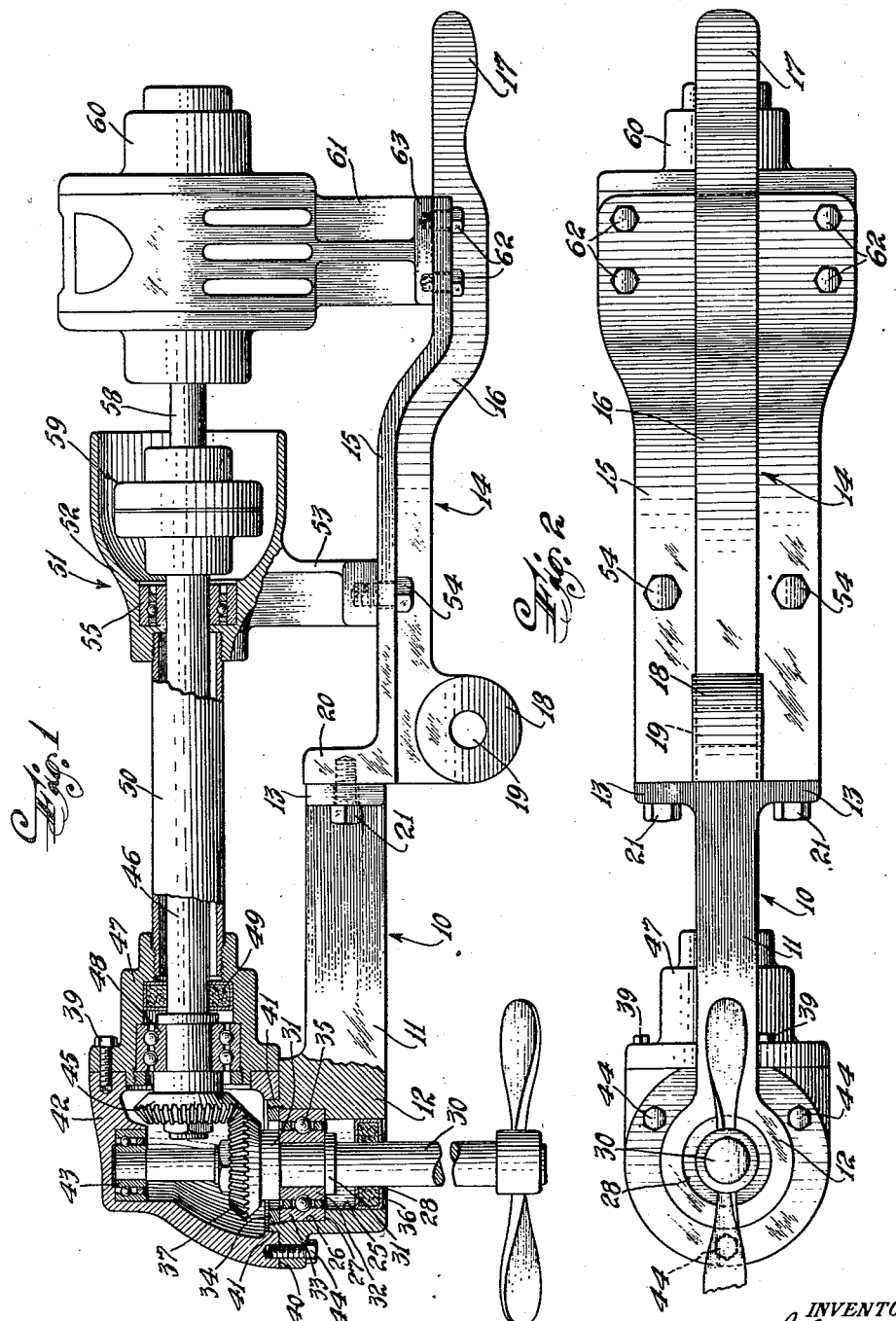
INVENTOR.
Austin H. Downs
BY Angelo M. Pisarra
ATTORNEY Patented Jan. 13, 1948

2,434,312

UNITED STATES PATENT OFFICE 2,434,312

MECHANICAL AGITATOR

Austin H. Downs, Glen Ridge, N. J., assignor to Eclipse Air Brush Co., Newark, N. J., a corporation of New Jersey Application December 20, 1945, Serial No. 636,177

3 Claims. (Cl. 74—16)

This invention relates to novel apparatus. More particularly this invention is directed to a novel apparatus having a rotatable main element. This novel apparatus finds a wide variety of uses in a large number of different fields. It may be employed in the ice cream field as an agitating device and also as a cutting device. It may be employed as an agitator or mixer in the paint and other industrial fields.

The device embodying the invention may be employed either as a portable unit or as a stationary fixed unit depending upon the conditions and extent of use. It may be readily and easily assembled to provide units which may be manufactured at a reasonable cost, units which are easy to control and units which are sturdy and rugged and require no unusual attention to maintain the same in excellent working condition. A form of the invention is illustrated in the drawings wherein:

Figure 1 is a side view of a device embodying the invention.

Figure 2 is a bottom view of the device shown in Figure 1.

As shown in the drawings, there is provided a front frame or supporting cast metal member 10. The supporting member 10 consists of an arm 11 extending rearwardly of an enlargement or head 12 and terminating at its rear in a pair of ears 13. A rear frame or supporting member 14 is demountably, but rigidly, coupled with the front supporting member 10 and may be a cast member consisting essentially of a supporting base 15 having a longitudinal rib 16 integral therewith. The rib 16 extends along the longitudinal center line of base 15 for the entire length thereof and materially beyond the same to provide a handle 17. The rib 16 depends from the base 15 and has an eye 18 integral therewith. The eye 18 has an opening 19 therethrough to accommodate a suitable connector for demountably retaining or coupling the device to a holding element. Integral with said base 15 and extending upwardly therefrom is a transverse element 20 whose outer face bears against the face of ears 13. The element 20 has a pair of threaded sockets in registry with the openings in ears 13. Bolts 21 are inserted through the openings in ears 13 and make threaded connections with the threaded sockets in element 20 to maintain the front and rear supports or frame members 10 and 14 rigidly, but demountably, secured to each other.

The head 12 has a pair of enlarged cylindrical concentric sockets 25 and 26 therein providing a shoulder 27. An opening 28 concentric with sockets 25 and 26 extends through the bottom of head 12. A cylindrical shaft 30 has the lower portion thereof extending through sockets 25 and 26 and extends through and beyond the opening 28. The upper end of said shaft 30 extends upwardly beyond the upper extremity of head 12. Said shaft 30 has a pair of cylindrical flanges 31 between which is disposed an inner race bearing 32; and the outer race bearing 33 rests on shoulder 27 and is locked in position by lock nut 34. The ball bearings 35 are located between the race bearings 32 and 33. A grease seal 36 rests in the bottom of head 12 and surrounds a portion of shaft 30 which passes therethrough. Located above the upper extremity of head 12 is a bevel gear 37 which is fixedly secured to shaft 30.

The head 12 is cut away at its upper outside periphery to provide a horizontal circular bearing flange 40 and a vertical cylindrical bearing flange 41. Mounted on said supporting head 12 is an upper enclosing hollow head and support 42 having an enlarged opening at one side thereof. The lower face of head 42 rests on shoulder 40 and the short cylindrical section thereof bears against flange 41. The head 42 is so arranged on head 12 so that the opening therethrough extends rearwardly and substantially parallel to the arm 11. The head 42 has a ball bearing assembly 43 similar to that heretofore described, located in the upper portion thereof, with its inner race bearing secured to the upper end of head 42. A plurality, and as shown three bolts 44 rigidly and demountably secure heads 12 and 42 together.

Meshing with the bevel gear 37 is bevel gear 45 located in the hollow head 42 and fixedly secured to a drive shaft 46 extending outwardly through the opening in the side of head 42 and being disposed substantially parallel to the arm 11. The shaft 46 is supported at one end by a hollow open ended side support 47 whose opening communicates with the opening in the side of head 42. The side support 47 has a ball bearing assembly 48 coupled therewith and with the shaft 46 and also a grease seal 49. The side support 47 is rigidly and demountably secured to the head 42 by bolts 39. Demountably coupled with the side head 47, extending along the length of shaft 46 and spaced therefrom is a hollow tubular member 50 which also serves as a handle. This tubular member 50 extends rearwardly beyond the section 20 and has coupled therewith a support and guard 51. The support 51 is essentially a hollow open ended cup-shaped member 52 having a supporting standard 53 integral therewith and depending therefrom. The standard 53 has a pair of cross ears extending across the platform 15. Bolts 54 extend through said platform and into said cross ears of standard 53 to rigidly and demountably secure the standard to the lower frame member 14. A bearing assembly 55 is coupled between the shaft 46 and the cup-shaped member 52 at the restricted end thereof. In the enlarged portion of said member 52 is a coupler 59 connected to one end of the shaft 46 and to a drive shaft 58 extending into an air driven motor 60. The air motor 60 is supported by a standard 61 having cross ears 63 resting on the base 15. Extending through the base 14 and into cross ears 63 are bolts 62 which rigidly but demountably secure the motor 60 in position. In this construction, the motor 60, guard and support 51, as well as side head 47, are all substantial aligned and at approximately right angles to the shaft 30.

The exposed or lower end of the shaft 30 may have rigidly, but demountably secured thereto, a mixing device of any particular contour, such as an ordinary blade, a propeller blade, a Z-blade or the like or any desired type of cutting blade, a screen type cream whipper or mixer or any other desirable device depending upon the material which is to be treated and on how the material is to be treated.

This assembly may be readily transported from place to place, by grasping the handle 16 with one hand, the tubular member 50, with the other. It may be rigidly and demountably secured at any desirable place by employing a clamping device at the eye 18 or it may be held manually in the manner indicated while operating.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim:

1. Apparatus of the class described comprising a drive shaft, means for driving said shaft, a second shaft disposed approximately at right angles to said first mentioned shaft and driven by said first shaft, means operatively connecting said shafts, supporting means carrying said second shaft, an arm extending rearwardly of said supporting means and coupled therewith, means secured to said arm and extending rearwardly thereof, said first mentioned means supported by said last mentioned means, a guard surrounding said first mentioned shaft and spaced from said arm and a handle secured to said third mentioned means and extending rearwardly thereof.

2. Apparatus of the class described comprising a drive shaft, means for driving said shaft, a second shaft disposed approximately at right angles to said first mentioned shaft and driven by said first mentioned shaft, means operatively connecting said shafts, supporting means carrying said first mentioned shaft, a housing having a side opening and supported by said supporting means, a side head secured to said housing and extending rearwardly of said housing, a tubular element, said tubular element and said side head surrounding said second shaft, supporting means secured to and extending rearwardly of said first mentioned supporting means, said second mentioned supporting means being spaced from said second shaft, said first mentioned means being supported by said second mentioned supporting means, and a handle coupled with said second mentioned supporting means and extending rearwardly thereof.

3. Apparatus of the class described comprising a drive shaft, a motor including a shaft, coupling means for said shafts, a third shaft driven by said drive shaft and being approximately at right angles thereto means operatively connecting said shafts, supporting means for said third shaft, supporting means extending rearwardly of said first mentioned supporting means and secured thereto, a housing having an opening through the side thereof and housing the adjacent ends of said first and third shafts, said housing secured to and extending outwardly from said first mentioned supporting means, a tubular element spaced from and surrounding said drive shaft, means secured to said housing at the side opening thereof, supporting one end of said drive shaft, and coupled with said tubular element, means carried by said second mentioned supporting means, supporting the other end of said drive shaft and coupled with said tubular element, extending rearwardly thereof and having said first mentioned coupling means therein, said motor supported by said second mentioned supporting means, that portion of said second mentioned supporting means, opposite said tubular element being spaced therefrom, said second mentioned supporting means being parallel to said tubular element.

AUSTIN H. DOWNS.

REFERENCES CITED

The following references are of record in the file of this patent:

UNITED STATES PATENTS

| Number | Name | Date |
|---|---|---|
| 947,643 | Lesko | Jan. 25, 1910 |
| 1,556,232 | Machek | Oct. 6, 1925 |
| 1,711,500 | Hutchens | May 7, 1929 |
| 2,083,771 | Bauman | June 15, 1937 |
| 2,159,256 | Clarke | May 23, 1939 |

FOREIGN PATENTS

| Number | Country | Date |
|---|---|---|
| 806,601 | France | Dec. 21, 1936 |